FIP8106 XR 3,600,587

United States Patent [11] 3,600,587

[72] Inventor Donald A. Smith
Schenectady, N.Y.
[21] Appl. No. 831,972
[22] Filed June 10, 1969
[45] Patented Aug. 17, 1971
[73] Assignee The United States of America as represented by the Secretary of the Army

[54] FREQUENCY SHIFT KEYING LASER COMMUNICATION SYSTEM
13 Claims, 12 Drawing Figs.

[52] U.S. Cl. 250/199, 325/30, 325/163, 178/66
[51] Int. Cl. H04l 27/10, H04b 9/00
[50] Field of Search 250/199; 325/30, 163; 178/66, 67

[56] References Cited
UNITED STATES PATENTS

| | | | |
|---|---|---|---|
| 3,032,611 | 5/1962 | Montgomery | 178/66 |
| 3,389,337 | 6/1968 | Hubbard et al. | 325/30 |
| 3,430,047 | 2/1969 | Hurkamp | 250/199 |
| 3,488,586 | 1/1970 | Watrous | 250/199 |

*Primary Examiner*—Robert L. Griffin
*Assistant Examiner*—James A. Brodsky
*Attorneys*—Harry M. Saragovitz, Edward J. Kelly, Herbert Berl and Daniel D. Sharp

ABSTRACT: An optical frequency shift keying system for representing a first binary signal condition by a first optical frequency and a second binary signal condition by a second optical frequency by means including an optical modulator biased to provide optical transmission predominantly at one of said optical frequencies during one of said signal conditions and to provide transmission at the other of said optical frequencies during the second condition.

INVENTOR,
DONALD A. SMITH
BY: Daniel D. Sharp,
Harry M. Saragovitz,
Edward J. Kelly &
Herbert Berl
ATTORNEYS.

INVENTOR,
DONALD A. SMITH

BY: Daniel T. Sharp
Harry M. Saragovitz,
Edward J. Kelly &
Herbert Berl
ATTORNEYS.

INVENTOR,
DONALD A. SMITH
BY: Daniel D. Sharp, Harry M. Saragovitz, Edward J. Kelly & Herbert Berl
ATTORNEYS.

FREQUENCY SHIFT KEYING LASER COMMUNICATION SYSTEM

The invention described herein may be manufactured, used and licensed by or for the government for governmental purposes without the payment to me of any royalty thereon.

BACKGROUND OF THE INVENTION

In recent years, digital optical communication systems have evolved which use various modulation types such as amplitude modulation, frequency modulation, and polarization modulation. It is desirable to use an optical modulation technique in which the influence of atmospheric disturbances and discontinuities is reduced, while also maintaining reasonably simple equipment for reliability. The technique of modulating the frequency of optical energy, as by laser incavity modulation by Kerr cells and the like, is relatively limited in bandwidth, since changes in frequency are accompanied by undesirable changes in laser cavity Q.

In optical amplitude modulation systems where the optical beams are varied in amplitude, the presence of an atmospheric environment can result in a rather large probability of bit error and such systems are also subject to complete loss of information in cases of selective fading. If one operates in a signal fading environment with an amplitude modulation form of binary communication, commonly referred to as amplitude keying or on-off keying (OOK), wherein the mark and space are represented, respectively, the presence and absence of a pulse, it is found that the probability of error, at large signal-to-noise-ratios, is relatively large. The error problem becomes more severe as the signal-to-noise-ratios return increases, since the error probability is proportional to the ratio of the natural logarithm of the signal-to-noise-ratio to the signal-to-noise-ratio.

Polarization modulation is subject to distortion owing to the disruptive affects of the atmosphere on the polarization of the transmitted energy; in some cases, the atmospheric conditions may be such as to prevent transmission entirely.

SUMMARY OF THE INVENTION

In accordance with the invention, a digital optical transmission system has been derived in which undesirable influence of atmospheric affects is reduced, while also providing a system of reasonable simplicity and cost.

The system of the invention involves optical frequency shift keying which, in response to application of a bilevel amplitude modulation signal, such as might be derived from a pulse code modulation system, to a birefringent electro-optic modulator, is capable of shifting between two widely spaced optical frequencies, such as may be derived from a red laser and an infrared laser. The modulator has transmission characteristics which vary with applied electric field or voltage. By properly biasing the modulator, either optically or electrically, the optical intensity vs. modulation voltage characteristics of the modulator for the two laser beams are of opposite slope and intersect at a point reasonably close to the half intensity point of the two characteristics.

In this way, the intensity at one optical frequency increases while that of the other optical frequency decreases as the modulator voltage increases, and vice versa. If the modulator is optically biased, as by passing each laser beam through a separate odd quarter retardation plate differing in retardation from the other by approximately one-half wavelength, the aforesaid characteristics of the modulator for the two frequencies cross over at a point of substantially zero applied voltage and the required modulating voltage for the modulator can be minimized. A two-level modulation voltage such as used in PCM can be used to drive the modulator and one laser beam is predominant at one level of applied modulating voltage and the other laser beam is predominant at the other level of applied modulating voltage.

The system according to the invention further includes a compatible detector which includes separate photosensitive means each capable of sensing a different one of the two transmitted optical frequencies and converting the transmitted beam intensity to a voltage. The detector circuitry includes means such as a differential amplifier for obtaining the difference of the aforesaid voltages. If there should be any deviation in the two voltage levels (mark and space) at the output of the differential amplifier, owing, for example, to atmospheric variations, the difference of an amplifier output can be applied to a Schmitt trigger to reconvert the signal to a bilevel voltage signal of constant level which is a substantial replica of the initial signal used to drive the modulator.

If one compares operation in a signal fading environment of the frequency shift keying (FSK) modulation of the invention with the OOK method of amplitude keying previously mentioned, it is found that, at large signal-to-noise-ratios, the probability of bit error for the FSK system of the invention, which varies inversely with the signal-to-noise--ratio is substantially less than that for the OOK system which is greater by a factor of the natural logarithm of the signal-to-noise ratio. The superiority of the frequency shift keying method in terms of probability of bit error, over the optical amplitude modulation system increases as the optical frequency decreases.

An advantage of the optical frequency shift keying system of the invention over either optical amplitude or frequency modulation system is that of improved frequency diversity. If one of the optical frequencies of the subject invention is severely affected by fading, while the other is not, the information will still be adequately received with the frequency shift keying system. If the fading characteristics are such that both frequencies are about equally affected, then the frequency shift keying method of detection compensates for this effect.

Another feature of the system of the invention is that adaptive techniques can be used with little added refinement. The detected optical signals are converted to two voltages at the receiver. The actual information is contained in the difference between the two voltages, while the sum of the two voltages contain the overall received signal level even though the information cancels out. The sum voltage can be used in an automatic gain control system to compensate for atmospheric fluctuation.

DETAILED DESCRIPTION OF THE PREFERRED EMBODIMENT

Figure 1:
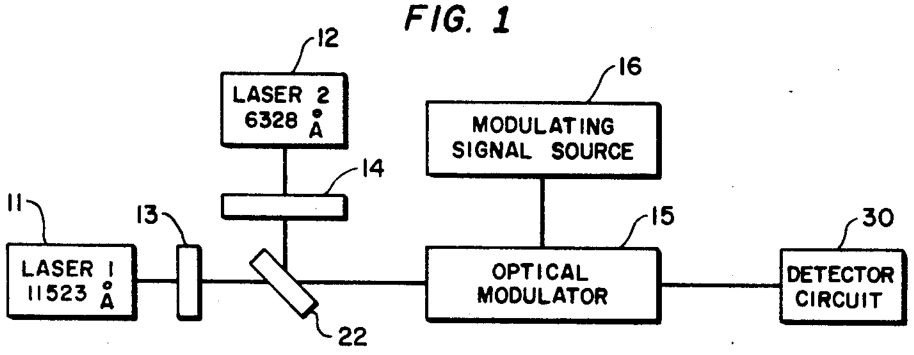
FIG. 1 is a simplified block diagram of an optical frequency shift keying system according to the invention.

Referring to FIG. 1, a block diagram of a system for transmitting and receiving an optical frequency shift keying type of digital signal is shown. The system must contain a source operating at two distinct optical wavelengths. This source may be either a single laser operating at two wavelengths simultaneously or two separate lasers, each operating at a distinct wavelength. An argon ion laser operates at several wavelengths simultaneously, predominantly at 4880 Angstrom Units and 5145 Angstrom Units. The helium-neon gas laser operates at a single wavelength which can be 6328 Angstrom Units, 11523 Angstrom Units or 33912 Angstrom Units. In the argon system, only one laser is needed and both wavelengths are visible, thus making alignment more convenient. Since the wavelengths are shorter for the argon laser than in the helium-neon laser, less modulating voltage is required; moreover, the available output power is greater with the argon system and sensitive detectors are readily available in the region of the argon lasers. Although two helium-neon gas lasers are required, the two together are less expensive and bulky than the argon laser and the helium-neon laser has a much lower input power requirement. In addition, the helium-neon laser system is more portable and has a much longer lifetime. Consequently, the system of FIG. 1 is illustrated as including a first laser 11 and a second laser 12 emitting optical beams at wavelengths of 11529 Angstrom Units and 6328 Angstrom Units, respectively. Since the two laser beams of the helium-neon system of FIG. 1, are initially separated physically, they may be passed through separate retardation plates 13 and 14 before they are combined. The advantage of using retardation plates will be mentioned subsequently. In an argon laser system, on the other hand, the two beams already are combined in the one laser and hence a more elaborate method of achieving a proper initial retardation between the two optical beams would have to be used.

Figure 2:
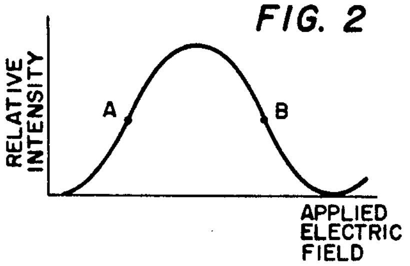
FIG. 2 is a curve indicating the effect of variations in electric field applied to the modulator of FIG. 1 upon relative light intensity.
Figure 3:
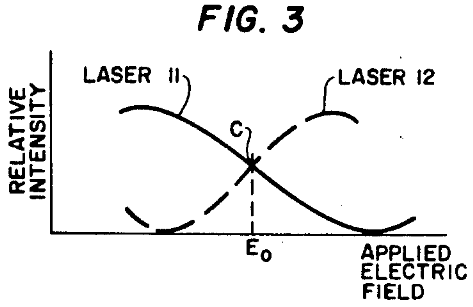
FIG. 3 illustrates typical modulation characteristics desirable for the modulator of FIG. 1.

The two beams of different optical wavelengths from lasers 11 and 12 are combined before being applied to modulator 15. For reasons to be mentioned later, the beam from laser 11 is passed through a three-quarter wave plate 13 while the beam from laser 12 first is passed through a quarter wave plate 14. The two optical beams from lasers 11 and 12 then are combined by an optical combiner 22 and then directed onto the modulator 15. The modulator 15 is shown as an electro-optical modulator characterized in that the intensity of light transmitted therethrough varies with the applied electric field, as shown in FIG. 2. The electric field, in turn, is a function of the modulating voltage supplied by the modulation voltage source 16. It should be understood, however, that the modulator 15 may also be of the magneto-optical type wherein the optical transmission characteristics would depend upon an applied magnetic field, in which case the modulating signal source 16 would supply a bilevel magnetic field to the modulator 15. The modulator 15 is characterized in that the intensity of optical energy transmitted from lasers 11 and 12 through the modulator 15 is related to the applied electric field by the overlapping characteristics of opposite slope shown in FIG. 3, with a crossover point C corresponding to an applied electrical field $E_o$. If no wave plates 13 and 14 were used, the modulator 15 of FIG. 1, would be biased electrically at or near the crossover point C, shown in FIG. 3, by a direct current voltage sufficient to produce an electric field $E_o$. By using the wave retardation plates 13 and 14, however, the modulating crystal 15 need not be stressed to a voltage corresponding to the electric field $E_o$ in FIG. 3 and the crossover point C shown in FIG. 3 can be effectively reduced to zero. The quarter wave plate 14 has the effect of a bias at the point labeled A in in FIG. 2, while the three-quarter wave plate 13 has the effect of a bias at the point labeled B in FIG. 2. In this manner, when the electric field is increased beyond $E_o$, the intensity of the beam from laser 11 transmitted through the modulator decreases, while the intensity of the beam from laser 12 transmitted through the modulator increases. As the electric field is decreased from $E_o$, the intensity of the transmitted beam from laser 11 increases while the intensity of the transmitted beam from laser 12 decreases. When using a two-level modulation, such as that involving pulse coded modulation, the levels are adjusted so that one optical frequency is dominant at one level of applied field and the other optical frequency is dominant at the other level. The pulse coded modulation (PCM) mark therefore is represented by one optical frequency, and the PCM space by another optical frequency. More specifically, the modulating voltage from modulating source 16 can be a digital voltage such that, when a negative voltage is applied to modulator 15, the modulator output is predominantly the infrared (11523 Angstrom Unit) beam from laser 11, on the other hand, when a positive voltage pulse is applied to modulator 15, the output therefrom is predominantly the red (6328 Angstrom Unit) beam from laser 12. The modulated light beams than are received by detector 30 of FIG. 1 which is capable of distinguishing between the two frequencies of optical transmission.

The modulator 15 of FIG. 1 can be made of potassium dihydrogen phosphate (KDP) which has a relatively large linear electro-optical coefficient at room temperature and is readily available in high optical quality. This KDP crystal is birefringent. As light energy having mutual perpendicular components enters the crystal modulator at an angle with respect to the $x$ and $y$ crystallographic axes, the ordinary and extraordinary beams travel at different velocities and the beams become more and more out of phase from one another as they traverse the length of the crystal. The projection of the resultant vector of the two waves with each other describes an ellipse; i.e. the wave is elliptically polarized. The eccentricity of the ellipse is the function of the phase difference or retardation $\Gamma$ between the ordinary and extraordinary light beams. Since it is required that the intensity of one beam increases while that of the other decreases in the modulator, the phase retardation of the beams passing a distance $d$ through the birefringent crystal modulator must differ by $\pi$. The path length $d$ necessary for two beams at different wavelengths initially in phase to travel through a birefringent crystal so that their difference in phase retardation is $\pi$, upon emergence, can be given by $$d=\left|\frac{1}{2(n_e-n_o)\left(\frac{1}{\lambda_1}-\frac{1}{\lambda_2}\right)}\right| \qquad (1)$$

where $n_e$ and $n_o$ are, respectively, the indices of refraction of the extraordinary and ordinary beams and $\lambda_1$ and $\lambda_2$ are the wavelengths of the two optical beams. In the special case in which the direction of propagation, the direction of applied electric field and the $z$-axis of the crystal and aligned, the phase difference $\Gamma$ is given by $$\Gamma=(2\pi d/\lambda)n_o^3V_{63}E_z \qquad (2)$$

where $n_o$ is the index of refraction of the ordinary beam, $r_{63}$ is the electro-optic constant, $d$ is the length of the optical path, $\lambda$ is the wavelength and $E_z$ is the component of the electric field along the $z$-axis of the crystal (the axis along which the light of the optical beams propagate). If $E_z$ is uniform along the length $d$ of the crystal, the applied voltage V across the crystal is equal to $E_zd$ and the phase difference $\Gamma$ is given by $$\Gamma=(2\pi/\lambda)n_o^3v_{63}V \qquad (3)$$

The output intensity I of an optical beam transmitted through the modulator crystal may be given by $$I=I_o\sin^2(\Gamma/2) \qquad (4)$$

Where $I_o$ is the intensity of the incident optical beam.

Figure 4:
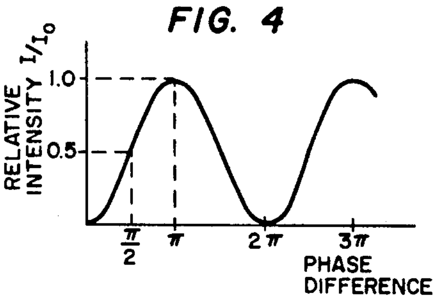
FIG. 4 is a curve illustrating effect of phase retardation in the electrooptical modulator of FIG. 1 upon the radiation intensity.

FIG. 4 shows the relationship between the phase difference $\Gamma$ and the relative relation intensity $I/I_o$. Since the energy passing through the modulator crystal includes optical energy of two wavelengths $\lambda_1$ and $\lambda_2$ there will be a retardation $\Gamma_1$ and $\Gamma_2$ associated with each of these wavelengths. The intensity reaches maxima at phase retardations of $\pi$, $3\pi$, $5\pi$, and so forth and reaches minima at retardations of 0, $2\pi$, $4\pi$ etc. The optical intensities $I_1$ and $I_2$ of the beams from the first and second lasers 11 and 12 transmitted through the modulator are, respectively $$I_1=I_o\sin^2(\Gamma_1/2) \quad (5)$$

$$I_2=I_o\sin^2(\Gamma_2/2) \quad (6)$$

As $\Gamma_1$ and $\Gamma_2$ are varied electrically, the output optical intensities are varied. In order to satisfy the condition that the intensity at 1 wavelength increases while that at the other wavelength decreases, the applied electric field must be such that $\Gamma_1$ and $\Gamma_2$ are in quadrature.

Figure 5:
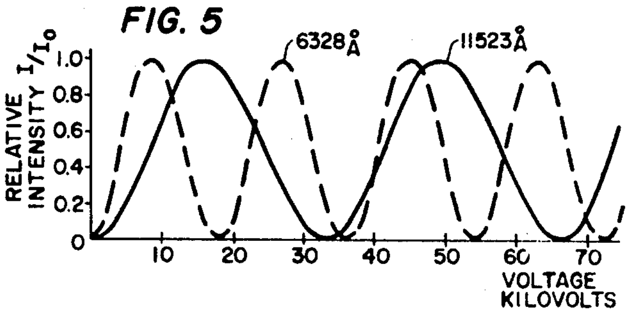
FIG. 5 is a plot showing the transmitted intensities of two optical frequencies as a function of light modulation voltage.

FIG. 5 shows the relative intensity of the beam at 6328 Angstrom Unit and 11523 Angstrom Unit as functions of the applied voltage for a practical modulator. The desired condition for intensity variation is met by the two DC bias voltages over the range plotted, namely 23 kv. and 58 kv. The peak-to-peak square wave needed to switch between the two wavelengths would have to be approximately 9 kv. The crystal is biased to yield $\Gamma=(\pi/2)$when no modulating voltage is applied. It is obvious that a power supply capable of biasing the crystal modulator to a voltage of the order of 23 kv. and 58 kv. imposes rather restrictive design requirements. It would be desirable, therefore, to reduce appreciably the bias voltage on the crystal. This DC bias voltage, corresponding to the applied field $E_o$ of FIG. 3, can be effectively reduced to zero volts by passing the beams from lasers 11 and 12 through the respective retardation plates 13 and 14 before they are combined and passed through the electro-optic modulator 15. In other words, instead of relying upon a relatively high bias voltage to the modulator crystal to provide a condition of phase retardation $\Gamma$ in the crystal for the two beams for which the transmitted optical intensity vs. applied voltage characteristic for the two optic beams are of opposite slope and have a crossover point reasonably close to the half intensity level, the desired retardation for the two beams can be attained by the approximate $\pi/2$ difference in phase retardation provided by the retardation plates 13 and 14.

Figure 6:
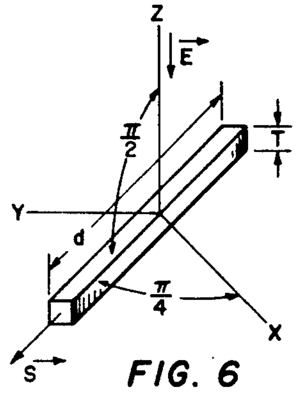
FIG. 6 is a view showing an optimum orientation for the crystal modulator of FIG. 1.

The second condition in design of the modulator 15 is that the required modulation voltage for substantially extinguishing one wavelength while maintaining substantially maximum intensity from the other wavelength be kept to a minimum. This involves locating the direction of the optic axes of the crystal, the direction of the applied electric field and the direction of propagation in order that the desired effect is accomplished with a minimum modulating voltage at 16. The optic axes is the $z$-axis of the crystal for which both the ordinary and extraordinary beams travel at the same velocity. A KDP crystal has one such axis when no field is applied, that is, it is uniaxial in the absence of an applied electric field. In the presence of an applied electric field, however, the KDP crystal is biaxial, that is, it has two distinct optical axes. It can be shown mathematically that the optimum crystal orientation is as shown in FIG. 6 in which the angle $\theta_E$ which the electric field E makes with the $z$-axis of the crystal 115 is $\pi$, the angle $\theta_s$ which the direction of propagation makes with the $z$-axis is $\pi/2$ and the angle $\Phi_S$ which the projection of the unit vector $s$ along the direction $d$ of propagation in the $x-y$ plane makes with the $x$-axis is $\pi/4$. In other words, the modulator crystal 115 is cut so that its longitudinal axis along length $d$ is 90° with respect to the $z$-axis and 45° with respect to the $x-y$ axis of the crystal 115.

Figure 7:
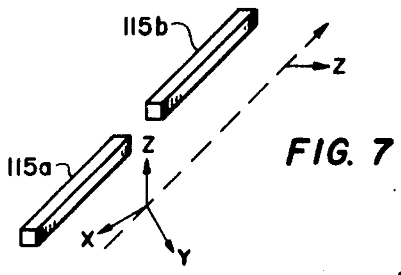
FIG. 7 is a diagram showing the orientation of a crystal pair for improving the operation of the modulator of FIG. 1.

A third condition imposed upon the modulator 15 of FIG. 1 is that the effect of natural birefringence on the phase retardation be substantially eliminated. The natural birefringent otherwise influences the phase retardation 65 of the modulator independently of the applied voltage from 16. This effect can be substantially eliminated by using two crystals *115a* and *115b* (or any other number of pairs of such crystals) and orienting the pair so that the $z$-axes are angularly displaced by $(\pi/4)$, as indicated in FIG. 7. In this manner, the net retardation produced by the pair of crystals is free of the natural birefringence effects and can be completely controlled by the modulating voltage applied to the crystal. The net retardation $\Gamma_{net}$ can be given by $$\Gamma_{net}=(2\pi d/\lambda t)n_o^3r_{63}V \quad (7)$$

Figure 8:
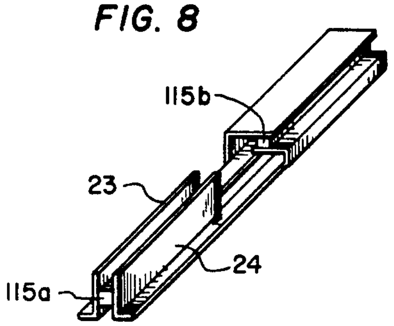
FIG. 8 is a view showing the method of mounting the modulator crystals of a given pair.

In one instance, each of the crystals *115a* and *115b* is cut in the orientation shown in FIG. 7 at an average length of 38.9 millimeters and with a 5 millimeter square cross section. The crystals *115a* and *115b* are mounted between two electrodes 23 and 24, as shown in FIG. 8. In one embodiment, six crystals are used, each section containing three crystals, with the $z$-axis of the crystals in section B (see FIG. 8) being rotated by $(\pi/2)$ radians from the $z$-axis of the crystals in section A. The crystals in each section are connected together end-to-end and can be cemented to the electrodes as by the silver epoxy and the exposed ends of the crystal can be adequately covered with cover plates cemented to the crystal in order to prevent the crystals from absorbing moisture and becoming pitted. The configuration shown in FIG. 8 can be mounted in a plexyglass case, not shown, and terminals for the electrodes mounted within the case. The length of the optical paths $d_1$ and $d_2$ through the first and second sections, respectively, of the modulator is approximately 38.9×3=116.7 mm. so that $(d_1/t\alpha x(d_2/t)=23.24$. The total retardation for such a crystal array is $$\Gamma_{net}=5.36\times10^{19}(V/\lambda) \quad (8)$$

If the length and thickness of the crystal (or crystals is chosen such that $d/t=20$ actually somewhat less than the modulator design already mentioned in which $d/t$ is about 23.3, than the retardation given by equation 2 becomes $$\Gamma_{net}=4.46\times10^{19}(V/\lambda) \quad (9)$$

From equation 4 one obtains $$I/I_o=\sin^2(2.23\times10^{19}(V/\lambda) \quad (10)$$

If the modulator is biased optically so that the red beam is retarded by a quarter of a wavelength while the infrared is retarded by three quarters of a wavelength, the relative intensity can be written $$(I_1/I_o)=\sin^2(2.23\times10^{19}(V/\lambda_1)\ P+(\pi/4) \quad (11)$$

and $$(I_2/I_0)=\sin^2(2.23\times10^{19}(V/\lambda_1)+(\pi/4) \quad (11)$$

Figure 9:
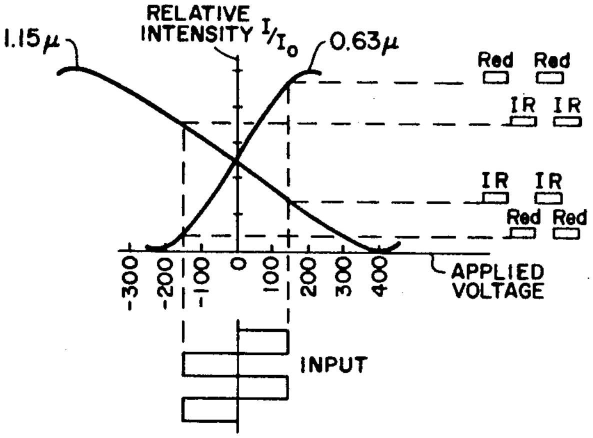
FIG. 9 is a plot of the optical intensities of light passing through the modulator of FIG. 1 as a function of applied voltage at optimum crystal orientation and illustrative of the two-color digital modulation.

These relative intensities are shown plotted as functions of applied modulating voltage in FIG. 9 for $\lambda_1$=6328 Angstrom Units and $\lambda_2$=11528 Angstrom Units.

FIG. 9 also illustrates graphically digital modulation when beams at two optical wavelengths are present. In this case the driving signal is a two-level voltage signal. The one level, which could be the mark of a pulse-code-modulated signal, is at a positive 150 volts, while the other level, which could be the space of a PCM signal, is at a negative 150 volts. Examination of FIG. 9 shows that in the output signal, the mark is composed of a beam at 6328 Angstroms wavelength with an intensity of 94 percent of its maximum and a beam at 1.15 microns wavelength with an intensity of 23 percent of its maximum; hence, it is predominantly red. Likewise, the space is composed of a beam at 1.15 microns wavelength with an intensity of 77 percent of its maximum and a beam at 6328 Angstroms at 6 percent of its maximum, hence it is predominantly infrared. The two-level voltage digital signal, therefore, is converted to a two-frequency digital signal.

Figure 10:
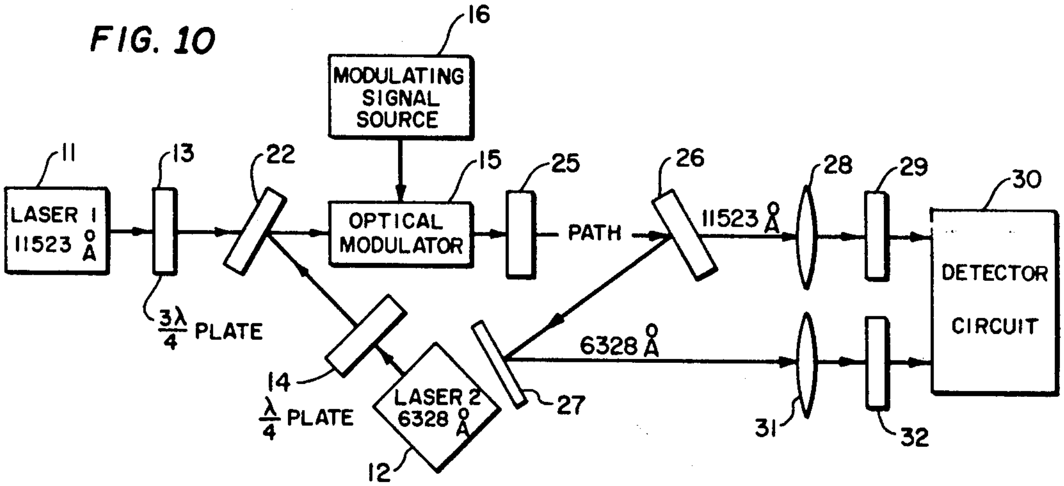
FIG. 10 is a block diagram showing a first embodiment of a complete frequency shift keying optical system.
Figure 11:
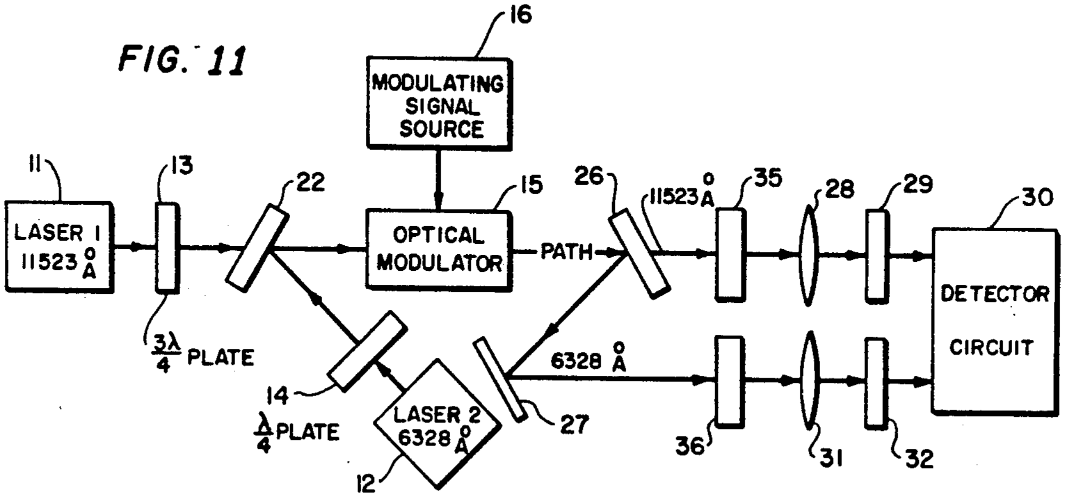
FIG. 11 is a diagram showing a second embodiment of a complete frequency shift keying optical system.

Two systems for achieving FSK optical modulation and detection are shown in FIGS. 10 and 11. Components in FIGS. 10 and 11 which are similar to those of FIG. 1 and components in FIGS. 10 and 11 which are identical are indicated by like reference numerals.

In the first system, shown in FIG. 10, a first laser 11 operates at an infrared wavelength of 11523 Angstrom Units and the second laser 12 emits a red optical beam at a wavelength at 6328 Angstrom Units. The optical beams from lasers 11 and 12 each are linearly polarized by means associated with the respective laser, such as by use of Brewster angle windows in the laser cavities. For the sake of explanation, it will be assumed that the polarization of the laser beams is 45° from vertical. The beam from laser 11 passes through the three quarter wave retardation plate 13, while the beam from laser 12 passes through the quarter wave retardation plate 14. These retardation plates are well known in the art and comprise a crystalline substance of such thickness and geometry that the ordinary and extraordinary beams emerge therefrom with a phase difference of either a quarter wavelength or three quarter of a wavelength, as the case may be, at the frequency of optical energy being transmitted. The thickness of such plates depends upon the wavelength of the incident optical energy. As is well known, when a quarter wave plate is oriented at an angle with respect to the plane of the incident plane-polarized optical energy, the emerging optical energy is elliptically polarized, and, if the aforesaid angle is 45° the emerging optical energy is circularly polarized. Depending upon whether the quarter wave plate is a positive or negative crystal, the emerging optical energy is either right circularly polarized or left circularly polarized. Thus, the optical laser beam from laser 12, after passing through the quarter wave plate 14, will be elliptically polarized in a generally clockwise or counterclockwise direction depending upon the type of crystalline material used. Similarly, the optical beam from laser 11, after passing through the three quarter wave plate 13, will be elliptically polarized in the opposite direction, provided, of course, that the same type of crystalline material is used. The elliptically polarized beams are combined at the beam combiner 22 which can be coated so that it passes nearly all of the infrared beam from laser 11 but reflects nearly all of the red beam from laser 12. The combined optical energy of the two beams then is directed onto the modulator 15 which is driven by a digital modulating voltage from modulating voltage source 16. As already stated, the modulator 15 is biased so that the retardation $\Gamma$ is equal to $(\pi/2)$ when no modulation voltage is applied. In other words, if there is no mark or space signal, the elliptically polarized red and infrared beams pass through the modulator 15 with essentially no change in polarization. As previously stated, the phase retardation $\Gamma$ for the red and infrared beams must differ by $\pi$. Consequently, the red and infrared beams emerging from the modulator 15 will have polarization components which are orthogonal. The marks of the digital modulating signal will be represented at the output of the modulator 15 by a beam in which the 6328 Angstrom Unit signal is substantially vertically polarized and the 11523 Angstrom Unit is substantially horizontally polarized. The spaces of the digital modulating signal will be represented by a beam in which the 11523 Angstrom Unit signal is substantially vertically polarized and 6328 Angstrom Unit is substantially horizontally polarized. The plane of polarization of the energy from the modulator 15 will depend upon the direction of rotation of the circularly polarized light incident upon the modulator.

The optical energy from the modulator 15, corresponding to a mark modulating signal, indicated in FIG. 9 as a positive going pulse of 150 volts peak amplitude, will be composed of a red beam at 6328 Angstrom Units wavelength predominantly vertically polarized and an infrared beam at 11523 Angstrom Units wavelength predominantly horizontally polarized. The polarization of the energy from the modulator 15 will be slightly elliptical rather than plane, and will have some components orthogonal to the major components just mentioned. Upon passing through the polarizer 25, which allows only the vertically polarized component to be transmitted, the optical energy will be a vertically polarized signal composed of a red beam at 6328 Angstrom Units with an intensity of about 94 percent of its maximum intensity and an infrared beam at 11523 Angstrom Units with an intensity of about 23 percent of its maximum intensity. The output of the combination of the modulator and the polarizer representing a mark, therefore, is predominantly red and vertically polarized; the most important factor here is that the emerging beam is predominantly red. Similarly, the optical output from the modular 15 representing a space modulating voltage, indicated in FIG. 9 as a negative going pulse of 150 volts peak amplitude, will be composed of an infrared beam at 11523 Angstrom Units predominantly vertically polarized and a red beam at 6328 Angstrom Units predominantly horizontally polarized. Upon passing through the polarizer 25, the optical energy will be a vertically polarized signal composed of an infrared beam at 11523 Angstrom Units with an intensity of 77 percent of its maximum intensity and a red beam at 6328 Angstrom Units at 6 percent of its maximum intensity. The output of the combination of the modulator and the polarizer representing a space, consequently, is predominantly infrared and vertically polarized. Again the important factor is that the beam representative of the space is predominantly infrared.

The polarizer 25 can be a Glan-Thompson polarizing prism which has a useful spectral range of from about 0.35 microns to 2.3 microns and, therefore, polarizes adequately at both wavelengths. The beam emerging from the polarizer, then, essentially is a vertically polarized beam which is a red beam at 6328 Angstrom Units during the presence of a modulator mark signal and an infrared beam at 11523 Angstrom Units during the presence of a modulator space signal. In the absence of either a mark or a space modulating signal at 16, the beam from the modulator 15 would be circularly polarized resulting in the output from the polarizer 25 of a beam vertically polarized but containing both a red beam at 6328 Angstrom Units and an infrared beam at 11523 Angstrom Units each at 50 percent of its maximum intensity. The red and infrared beams representing, respectively, a mark or space signal, are transmitted over the desired transmission path.

At the receiver, the beams are incident on a beam splitter 26 which is coated so that it transmits substantially all of one of the beams (in this case, the infrared beam) and reflects nearly all of the other beams (in this case, the red beam) onto a mirror 27 from which the beam is directed along a path separate from the path of the infrared beam. The red and infrared beams, thus separated, can be made to impinge upon separate portions of the detector 30. For improved operation, a system of lenses and filter preferably is used in the system. The infrared beam passing through the beam splitter 26 is focused by a lens 28 onto a filter 29 which is transparent only to the infrared beam, thereby, cleaning up any traces of red energy which may have been transmitted during the space condition or reflected by the beam splitter 26. Similarly, the red beam reflected from mirror 27 is focused by a lens 31 onto a filter 32 which selectively transmits only the red beam, thereby cleaning up undesired traces of infrared energy which may have been transmitted during the mark condition or which may have been reflected from the beam splitter and directed onto mirror 27. In some instances, the physical separation of red and infrared optical beams by the beam splitter and mirror are sufficient and the optical filters are not essential to prevent any remaining signal of other than the desired wavelength from reaching the proper portion of the detector 30.

Before preceding with the discussion of the detector circuit 30, a modification of the FSK optical system of FIG. 10 will be described. This modification is shown in FIG. 11 and the transmitter is similar to the transmitter of FIG. 10 except that no polarizer need be placed after the modulator. The modulator output is transmitted directly over the transmission path. The transmitted signal contains both wavelengths simultaneously, each with a specific predominant polarization, as already described. At the receiver, the two beams are separated as before with the beam splitter 26. At this point, the two beams pass through dichroic polarizers 35 and 36 allowing only the vertically polarized red or infrared signals, as the case may be, to be transmitted therethrough. The polarizer used for the red signal has, for example, a useful spectral range of 0.45 to 9.85 microns while the polarizer used for the infrared signal has a useful spectral range of 0.80 to 2.20 microns. From this point on, the two signals are applied, as before, to the separate portions of the detector circuit 30.

Figure 12:
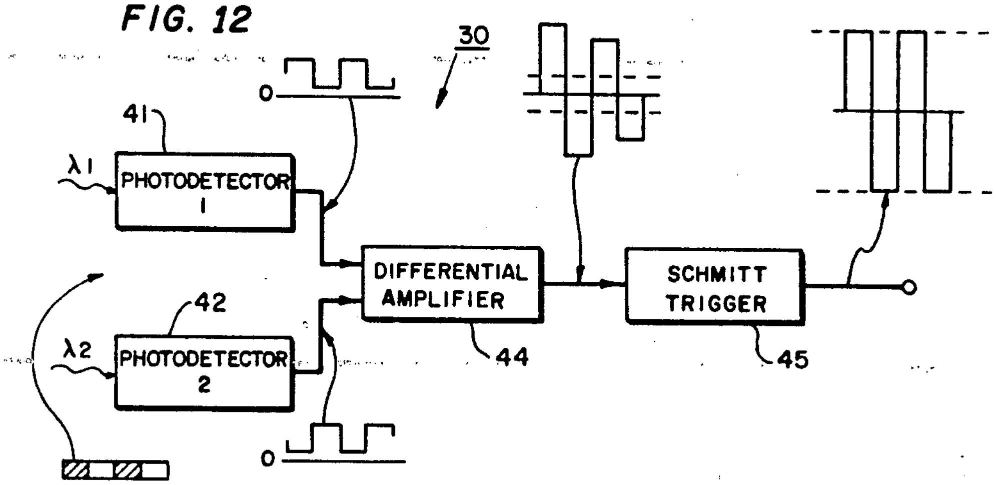
FIG. 12 is a block diagram of a typical detection system.

The detector circuit 30 senses the optical beams and distinguishes between the two frequencies by using two separate photodetectors 41 and 42 each having a good response at a respective one of the wavelengths. By preceding each photodetector with a narrow passband optical filter 29 and 32 centered at the desired wavelength, only one frequency will actually reach the surface of each photodetector. The circuitry following the photodetectors 41 and 42 will be such as to convert the photodetector outputs into a replica of the modulating voltage, as indicated in FIG. 12. Each photodetector converts its respective optical signal into a voltage variation. The outputs derived from the photodetectors 41 and 42 are subtracted, as by a differential amplifier 44 which amplifies the difference in the two photodetector outputs; the optical signals receives by each of the photodetectors thus is converted into corresponding voltage levels, which, in the absence of atmospheric variations, will be a substantial replica of the modulating signal applied to modulator 15. If there should be deviations in the two levels of voltage at the output of the differential amplifier, arising, for instance, from atmospheric fading or other variations, a Schmitt trigger circuit 45 is used to convert the signal back to the desired replica of the bilevel modulating signal.

It is to be understood that the invention is not limited to the exact details of construction shown and described for obvious modifications will occur to persons skilled in the art.

What I claim is:

1. An optical frequency shift keying system for representing a first binary signal condition by a first optical frequency and a second binary signal condition by a second optical frequency comprising means for providing first and second optical beams of said first and second optical frequencies respectively, means for combining said optical beams, an optical modulator positioned in the path of said combined optical beams and having optical transmission characteristics which vary with a modulating signal, means for supplying a modulating signal of first and second level representing respectively said first and second conditions, and means for biasing said modulator to provide transmission therethrough predominantly of said first optical frequency during application to said modulator of the modulating signal of said first level and transmission predominantly at said second optical frequency during application to modulator of the modulating signal of said second level, wherein said biasing means includes a first *n*-quarter wave retardation plate in the path of said first optical beam and a second *n*-quarter wave retardation plate in the path of said second optical beam, the value of *n* for the two plates differing by an integral multiple of two.

2. An optical frequency shift keying system for representing a first binary signal condition by a first optical frequency and a second binary signal condition by a second optical frequency comprising means for providing first and second optical beams, of said first and second optical frequencies respectively, means for combining said optical beams, an optical modulator positioned in the path of said combined optical beams and having optical transmission characteristics which vary with a modulating signal, means for supplying a modulating signal of first and second levels representing respectively said first and second conditions, and means for biasing said modulator to provide transmission therethrough predominantly of said first optical frequency during application to said modulator of the modulating signal of said first level and transmission predominantly at said second optical frequency during application to the modulator of the modulating signal of said second level, wherein said biasing means includes a three quarter wave retardation plate disposed in the path of said first optical beam preceding said modulator and a quarter wave retardation plate disposed in the path of said second optical beam preceding said modulator.

3. An optical frequency shift keying system according to claim 1 wherein said biasing means comprises a source of unidirectional voltage of predetermined level applied to said modulator.

4. An optical frequency shift keying system for representing a first binary signal condition by a first optical frequency and a second binary signal condition by a second optical frequency comprising means for providing first and second optical beams of said first and second optical frequencies respectively, means for combining said optical beams, an optical optical modulator positioned in the path of said combined optical beams and having optical transmission characteristics which vary with a modulating signal, means for supplying a modulating signal of first and second levels representing respectively said first and second conditions, and means for biasing said modulator to provide transmission therethrough predominantly of said first optical frequency during application to said modulator of the modulating signal of said first level and transmission predominantly at said second optical frequency during application to the modulator of the modulating signal of said second level, wherein said modulator is of the electrooptical type comprising at least one pair of crystals having the crystallographic axes orthogonally arranged with respect to one another.

5. An optical frequency shift keying system comprising means for producing first and second optical beams of different frequency, and a modulator interposed in the path of said beams and having transmission characteristics which vary in accordance with an applied field, modulating means for applying a modulating signal of a first level to said modulator representative of a mark signal and a modulating signal of a second level to said modulator representative of a space signal, biasing means for biasing said modulator to provide optical beam transmission intensity vs modulating signal level characteristics of opposite slope for said first and second beams, said modulator responding to said modulating signal of first level and said biasing means for effecting optical transmission through said modulator predominantly that of said first beam said modulator responding to said modulating signal of said second level and said biasing means for effecting optical transmission through said modulator predominantly that of said second beam.

6. An optical frequency shift keying system according to claim 1 wherein said modulator is of the electrooptical type.

7. An optical frequency shift keying system according to claim 5 wherein said modulator is of the magneto-optical type.

8. An optical frequency shift keying system according to claim 1 each of said optical beams transmitted through said modulator consisting of two orthogonal components of elliptical polarization further including polarizing means following said modulator for transmitting only one of the two orthogonal components of polarization of said first and second optical beams emerging from said modulator.

9. An optical frequency shift keying system according to claim 8 further including beam splitting means following said polarizing means for transmitting the orthogonal component of said optical beam emerging from said polarizing means along one path and reflecting the orthogonal component of the second optical beam emerging from said polarizing means along a separate path.

10. An optical frequency shift keying system according to claim 5 further including detecting means responsive to the optical frequencies transmitted through said modulator for converting said beam intensities into electrical signals representing said first and second conditions.

11. An optical frequency shift keying system according to claim 10 wherein said detecting means includes first and second photodetectors each receptive of optical energy from one only of said beams and having a good response only to energy from said one beam for deriving a voltage variation and means for subtracting the voltage variations of said photodetectors to derive an output electrical signal which is a substantial replica of said modulation signal.

12. An optical frequency shift keying system according to claim 1 wherein said first and second optical beams originally are linearly polarized, said wave retardation plates operating upon a corresponding optical beam to provide optical beams therefrom of opposite elliptical polarization, said modulator acting upon said beams of opposite elliptical polarization to provide a pair of emergent beams each having predominant linearly polarized components which are orthogonal to one another.

13. An optical frequency shift keying system according to claim 5 each of said optical beams transmitted through said modulator consisting of two orthogonal components two orthogonal components of elliptical polarization, further including beam splitting means following said modulator for transmitting both orthogonal components of the first optical beam along one path and reflecting both orthogonal components of the second optical beam along a second path, and separate polarizing means disposed in each of said paths for transmitting one only of said orthogonal components of each of said beams.